UNITED STATES PATENT OFFICE.

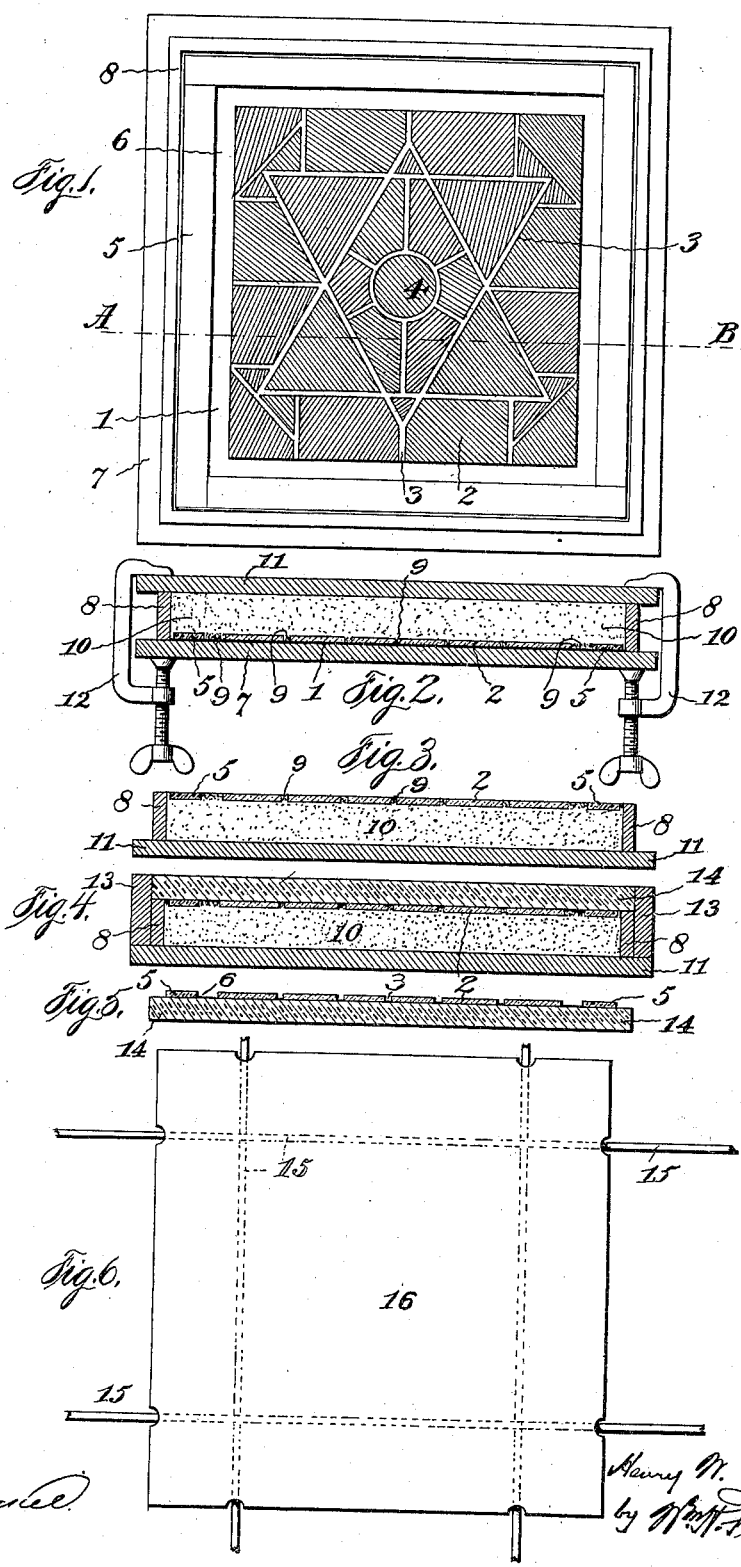

HENRY W. SCATTERGOOD, OF PHILADELPHIA, PENNSYLVANIA.

PROCESS OF FRAMING GLASS OR OTHER MATERIALS.

SPECIFICATION forming part of Letters Patent No. 709,513, dated September 23, 1902.

Application filed June 19, 1902. Serial No. 112,381. (No specimens.)

*To all whom it may concern:*

Be it known that I, HENRY W. SCATTERGOOD, a citizen of the United States, residing at Philadelphia, in the county of Philadelphia and State of Pennsylvania, have invented a certain new and useful Improvement in Processes of Framing Glass or other Materials, of which the following is a full, clear, and exact description.

Various methods have been devised for substituting for lead frames an electrodeposited framing for stained-glass windows and other objects composed of pieces or bits of glass or other material. Framing glass by means of lead strips cut and bent about the constituent pieces of the object and united by soldering has its limitations and especially with respect to the sizes of the constituent pieces. This is notably true in any attempt to simulate mosaics by the use of glass or tile or other vitreous or ceramic material. Moreover, it has limitations also in the use of what are known as "jewels," which in this art may be described as thick pieces of glass having one flat face and another face cut with facets.

It is desirable in framing by the electrodeposition process that the constituent pieces of the object should all rest in practically the same uniform plane, so that there may be no creeping or crawling or spreading of the electrodeposited metal on that side and so that the electrodeposited metal may be built up to practically the same height on the opposite side no matter what irregularities may be on such opposite side, and one purpose of this invention is to provide for this uniformity of surface.

In carrying out my invention I first produce the design of the object on thin paper and then stick the pieces of glass or other material upon this paper by means of any suitable adhesive, with spaces between the contiguous edges of the pieces, and then a border of non-conducting material, such as strips of wax or wax composition or any other non-conducting material, is laid around the object, with spaces between the perimeter of the object and the inner edges of the border. These spaces, as in prior processes, are designed to receive the electrodeposited metal frame. The paper may have been previously laid upon a suitable rigid support, such as a board, or it may be transferred to such board after the constituent pieces have been attached to it, and then a curb of considerably greater height than the height of the highest constituent piece is placed around the border. The spaces are then filled with some substance—such as starch or starch composition or cream of tartar, dry or in the form of paste, and the like, and which is capable of being dissolved or washed out of the spaces—and then the object is covered with sand to the top of the curb, the sand being packed in rather solidly. Another board is then placed on top of the curb and over the sand, the two boards clamped together, and the object is reversed, when the first-mentioned board is removed, the paper stripped off or washed off, and the substance in the spaces metallized by the application of suitable metallic powder, and then another curb higher than the first is placed around the first curb or a curb of the same size is placed on top of the first curb, and then the back of the object, with the exposed metallization, is painted over with fluid wax or an equivalent adherent, and then the second curb is filled with molten wax or any other material that will solidify rigidly and adhere to the constituent members of and may be readily separated from the object by heat or other external force. The wax forms a backing during the remainder of the process. The curbs and the supporting-boards are then removed, together with the sand, and the fugitive filling in the spaces cleaned out, and then the object upon the wax or its equivalent as its support is exposed to the action of an electrolytic bath and a framing formed by the deposition of metal in the spaces, the metallization of said spaces providing the conductors. The details of connecting the piece of work with the conductors may be varied in accordance with the workman's desires or practice; but I have found that by metallizing portions of the surrounding strips the connection of the bath-wires may be effectively made, and I have also found that it is well to embed a number of conducting-wires in the removable backing, allowing their ends to project, so as to afford coupling members for the bath-wires. The result of this process of assembling the constituent pieces of the object is that a practically uniform back is produced on the object with all of the pieces in one plane and with none of the electrodeposited metal creeping or spreading beneath the pieces.

The invention is applicable to transparencies and to inlaid work and to a great variety of objects needless to specify here.

In illustration of my invention reference is made to the accompanying drawings, in which like parts are similarly indicated in the several views, and wherein—

Figure 1 is a plan view illustrating the design arranged to receive the second board. Fig. 2 is a cross-section taken substantially in the plane of line A B, Fig. 1, with the second board clamped to the first. Fig. 3 is a cross-section with the first board removed and the object turned upside down. Fig. 4 is a view similar to Fig. 3 with the second curb in place and the backing applied. Fig. 5 is a cross-section showing the object ready for the bath. Fig. 6 illustrates the application of the conducting-wires to the backing.

1 may represent a sheet of tissue-paper or other fugitive substance, upon which the design of the object to be made is placed, and upon this piece of paper are placed the bits or pieces 2, which enter into the composition of the object, and these pieces 2 may be stuck to the paper by means of any suitable adhesive, always observing to leave spaces 3 between the contiguous edges of the constituent pieces. These constituent pieces may be of the same or different materials and size, shape, or height, but preferably with one face smooth or comparatively smooth. As indicated, the centerpiece 4 may be a jewel with or without facets. Placed about the perimeter of the constituent pieces is the border 5, composed of strips of wax or wax composition or glass or any suitable non-conductor of electricity with a space 6 between the inner edges of the border and the perimeter of the object. The work thus built up upon the paper may be transferred to any suitable rigid support, such as a board 7, or the paper may have been arranged upon such board in the first instance. Then a curb 8, of wood or other suitable material, is placed around the border 5. The spaces 3 and 6 are then filled with a substance that may be readily washed out—such as starch, cream of tartar, or other material in powder or paste form—as indicated at 9 by the heavy stippling, and then sand 10, preferably wet sand, is placed on top of the pieces or bits 2 and 4 and the border 5 and packed in until the curb is practically filled. The second board 11 is then placed on top of the curb 8 in the sand and clamped thereto in any suitable manner, as by screw-clamps 12, and then the object is reversed, as shown in Fig. 3, and the paper is stripped off. The matter in spaces 3 and 6 is then metallized by the application of metal powder dusted or forced in, as shown by the heavy lines in the spaces in Figs. 4 and 5, and the surplus removed, some of the powder being continued across the border-strips 5 to the exterior in order to form connections for coupling with the bath-wires. The whole of the back is then painted with fluid wax or other adhesive, such as Venetian turpentine, and then the second curb 13, which may be of larger diameter and greater height than the curb 8, so as to fit around it, as in Fig. 4, or which may be of the same dimensions as the curb 8, is then put in position and melted wax or other easily-removable material 14 is introduced into the second curb about the constituent pieces of the object and above the border and allowed to harden or set, and then the sand is removed and the matter in the spaces washed out and the object cleaned. The metallization should be found adhering to the support 14 in the various spaces 3 and 6, and there should be sufficient extending beyond the border strips 5 at intervals to form a good connection with the electric wires, and such connection having been made the object is placed in an ordinary electrotyper's or electroplater's bath having, by preference, a copper-sulfate solution and a dynamo for generating the current, and the object is then subjected to the electric current for a period sufficient to electrodeposit the metal in the spaces 3 and 6 until a frame of sufficient thickness and rigidity is formed to support the constituent pieces of the object when removed from the backing 14. If the backing 14 be of wax, it may be separated from the object by the application of gentle heat—for example, by pouring hot water over the face of the work until the backing is softened sufficiently to permit the work to be slid off; but the medium used for separating the object from its backing will be conformed to the nature of the backing, and I do not limit myself to the kind of backing employed so long as it is of sufficient rigidity to support the constituent pieces in substantially the same plane in order to secure practical uniformity of level in the object and is or is capable of being rendered adherent to the constituent pieces temporarily.

As already indicated, the electric connections may be facilitated by applying conducting-wires 15 in a backing 16 of wax or other suitable material in such position as to cross the metallization in the spaces 3 and 6, as illustrated, for example, in Fig. 6.

As compared with prior processes the pouring of the wax on the constituent pieces in accordance with this present process makes a perfect contact with these pieces, prevents the spreading of the deposit under the pieces, and leaves only the spaces to receive the deposit, and these advantages are quite material, especially in making up objects of a multitude of small pieces after the manner of mosaics.

It is within my invention to proceed with the electrodeposition of the metal for a given period, then supply the spaces with a filling of metal powder or other substance, and then again proceed with the electrodeposition of the metal on top of this filling.

Of course it is understood that when wax is used for backing it will be employed in a fluid state, and the curb should be so constructed as to prevent the waste of the wax. When I refer to "wax," I mean not only pure wax, but any composition of wax or of a waxy nature suitable for the purpose. I may use other plastic substances also that may be molded to the back of the work in a detachable manner. Care should be taken not to use a fluid so thin as to readily mix with the soluble filling, and I have found that if the wax or wax composition be only sufficiently fluid to run freely every practical purpose will be answered.

The arrangement of the electrical connections and the voltage and the density of the solution are within the skill of the operator, and I have found that the usual practice in the electrodeposition of copper or electroplating of copper as followed by electrotypers and electroplaters is applicable for my purpose.

An important feature of the invention is the use of a temporary space-filling medium to receive the metallization, and my invention contemplates such use whether the support 10 be used or not. For example, if the constituent pieces be of practically uniform thickness then the said pieces may be stuck on the base as before, the spaces filled with the fugitive material, this filling metallized on top, a backing of wax or the like applied, the base and the filling then removed, and the electrodeposition proceeded with.

In all cases after the object is completed it should be washed and all traces of the wax removed, which may be readily done with turpentine or other solvent.

The object comes from the bath provided not only with a metal frame in the interstices between the constituent pieces, but also with a frame around the perimeter, and is ready after cleaning to be utilized in a sash or other receptacle, in accordance with the use to which it is to be applied.

What I claim is—

1. The process of framing glass and other material, consisting in arranging the constituent pieces upon a removable base, with spaces between their contiguous edges and around the perimeter, filling said spaces with a substance capable of being dissolved or washed out, metallizing the filling in the spaces, applying a backing to the thus-metallized object, removing the base and filling, and then exposing the object to the action of an electrodepositing apparatus and thereby supplying the spaces with electrodeposited metal.

2. The process of framing glass and other material, consisting in arranging the constituent pieces upon a removable base, with spaces between their contiguous edges and around the perimeter, filling said spaces with a starch-like substance, covering the object with a removable supporting material, reversing the whole, detaching the base, metallizing the spaces, applying a backing to the thus-metallized object, removing the support and filling, and then exposing the object to the action of an electrodepositing apparatus whereby the spaces are supplied with electrodeposited metal.

3. The process of framing glass and other material, consisting in arranging the constituent pieces upon a removable base, with spaces between their contiguous edges and around the perimeter, filling said spaces with a fugitive soluble substance, covering the object with a removable supporting material, reversing the whole, detaching the base, metallizing the spaces, coating the thus-metallized object with an adhesive, applying a backing to the thus metallized and coated object, removing the support and filling, and then exposing the object to the action of an electrodepositing apparatus and thereby supplying the spaces with electrodeposited metal.

4. The process of framing glass and other material, consisting essentially in sticking the constituent elements of the object upon a fugitive base, such as tissue-paper, with intervening spaces between the said constituent elements, surrounding the object with a non-conducting border, with an intervening space, inclosing the thus-bordered object in a curb, filling the spaces with a fugitive substance, capable of being washed or dissolved out covering the object to the height of the curb with sand or other removable packing, reversing the object, removing the base and substituting therefor metallization, sticking on such metallization, then applying a backing of plastic material, then removing the backing and the filling and cleaning the object, and finally exposing the object upon its backing to the action of an electrodepositing or an electroplating apparatus and depositing in the spaces the metal of the bath, and then removing the object, detaching the backing and cleaning said object.

5. The process of framing glass and other material, consisting essentially in sticking the constituent elements of the object upon a fugitive base, such as tissue-paper, with intervening spaces between the said constituent elements, surrounding the object with a non-conducting border, with an intervening space, inclosing the thus-bordered object in a curb, filling the spaces with a substance capable of being dissolved or washed out, covering the object to the height of the curb with a removable packing, reversing the object, removing the base and substituting therefor metallization, sticking on such metallization, then applying a backing of plastic material, then removing the backing and the filling and cleaning the object, and finally exposing the object upon its backing to the action of an electrodepositing or an electroplating apparatus and depositing in the spaces a film of metal, then removing the object and introducing into the spaces a filling of metal powder, filings or other substance, then replacing in the bath and electrodepositing a finishing-film upon the filling, and finally removing the object from the bath and its backing, and cleaning it.

In testimony whereof I have hereunto set my hand this 18th day of June, A. D. 1902.

HENRY W. SCATTERGOOD.

Witnesses:
HENRY MARSH,
JOHN M. HARPER.